United States Patent [19]
Kemmerer et al.

[11] Patent Number: 5,950,755
[45] Date of Patent: Sep. 14, 1999

[54] PERSONAL MOBILITY SCOOTER

[76] Inventors: Kenneth Kemmerer, 768 Keating St., Wilkes-Barre, Pa. 18702; Kenneth Casey, 50 Deer Run Rd., Plymouth Township, Pa. 18651

[21] Appl. No.: 08/835,465

[22] Filed: Apr. 8, 1997

[51] Int. Cl.[6] .................................................. B62D 61/00
[52] U.S. Cl. ................................................................ 180/216
[58] Field of Search .................................. 180/208, 210, 180/211, 212, 213, 214, 215, 216, 217, 65.1, 907, 311

[56] References Cited

U.S. PATENT DOCUMENTS

| | | | |
|---|---|---|---|
| 2,468,801 | 2/1949 | Beall | 180/214 |
| 3,952,822 | 4/1976 | Udden et al. | 180/210 |
| 4,570,739 | 2/1986 | Kramer | 180/208 |
| 4,945,795 | 8/1990 | Hopely, Jr. | 180/216 |
| 5,020,624 | 6/1991 | Nesterick et al. | 180/208 |
| 5,150,762 | 9/1992 | Stegeman et al. | 180/216 |
| 5,318,144 | 6/1994 | Berlinger, Jr. | 180/208 |
| 5,503,243 | 4/1996 | Kruse | 180/216 |

OTHER PUBLICATIONS

Pride Health Care Inc. Brochure "Shuttle", 4 pages.
Ranger All Season Corporation, "Solo", 2 pages.

*Primary Examiner*—Kevin Hurley
*Attorney, Agent, or Firm*—David A. Tamburro

[57] ABSTRACT

A personal mobility vehicle having a novel support mechanism for the front wheel which maximizes the amount of foot space available for the occupant of the vehicle. The mobility vehicle has a main tubular base frame formed by laterally spaced, longitudinally extending side members joined by a front nose section. The front wheel is mounted within and behind the front nose section by a novel bracket assembly which maximizes the amount of foot space available on the floor board around the wheel housing.

6 Claims, 2 Drawing Sheets

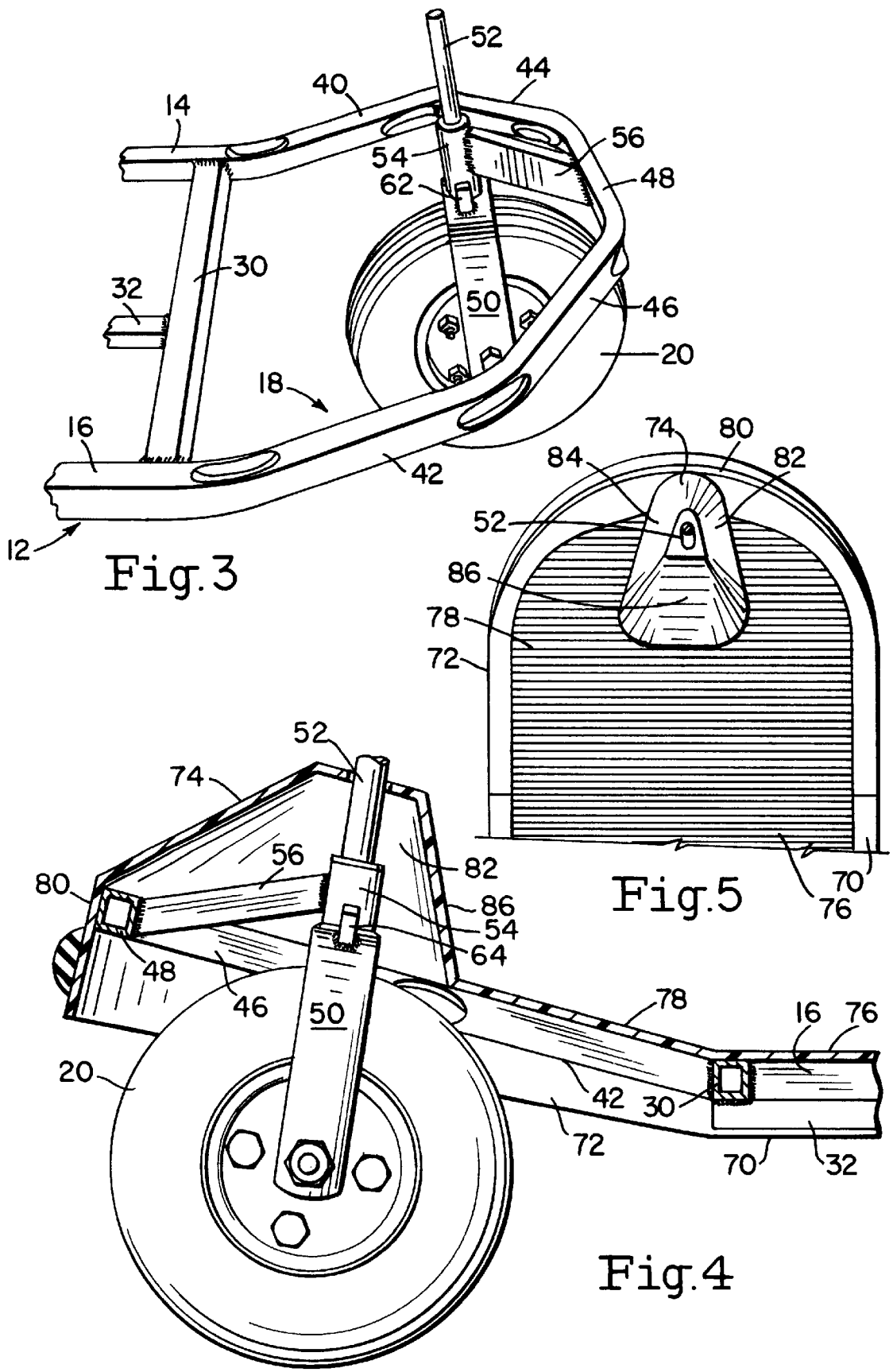

PERSONAL MOBILITY SCOOTER

BACKGROUND OF THE INVENTION

This invention relates generally to self-propelled personal mobility vehicles or scooters intended for use by persons having some physical disability, and more particularly is directed to a scooter in which the available foot room around the front wheel and its housing or fender is maximized to make it easier for a person to get in and out of the vehicle.

Small personal mobility scooters have been developed to provide persons with partial or total walking disabilities with the ability to move about either indoors or outdoors within a realistic range. Popular among those type vehicles is a self-propelled three-wheeled vehicle which includes a main base frame supported by a pair of rear wheels powered by a rear mounted battery operated motor system, a steerable centrally located front wheel, a seat unit located between the front and rear wheels, and a floor board or platform covering the top of the frame and supporting the feet of the person as that person gets in or out of the vehicle or while the person is driving the vehicle.

In such vehicles it is imperative that the disabled person be provided with as much comfort as possible since his ability to move his body and particularly his legs and feet quite often are very restricted and the movement is slow. Thus the amount of space available on the foot platform between the seat and the front wheel and/or the wheel housing should be as large as possible to make it easier for a person to move his legs and feet around on that platform.

SUMMARY OF THE INVENTION

Accordingly the primary object of this invention is to provide a personal mobility vehicle of the type described above with a novel support mechanism for the front wheel which maximizes the amount of foot space available for the occupant of the vehicle.

Still another object of the invention is to provide the above mobility vehicle having a main tubular base frame formed by laterally spaced, longitudinally extending side members joined by a front nose section, the front wheel being mounted within and behind the front nose section by a novel bracket assembly which maximizes the amount of foot space available on the floor board around the wheel housing.

Other objects and advantages will become apparent from reading the following description of the invention wherein reference is made to the drawings.

BRIEF DESCRIPTION OF THE DRAWINGS

FIG. 3 is a fragmentary perspective view of the front wheel mounting assembly with the floor board structure removed;

FIG. 4 is a fragmentary sectional view of the front wheel mounting assembly with the floor board structure in place;

FIG. 5 is a fragmentary perspective view illustrating the front portion of the floor board and the reduced size of the front wheel housing or fender;

DETAILED DESCRIPTION OF THE INVENTION

Figure 1:
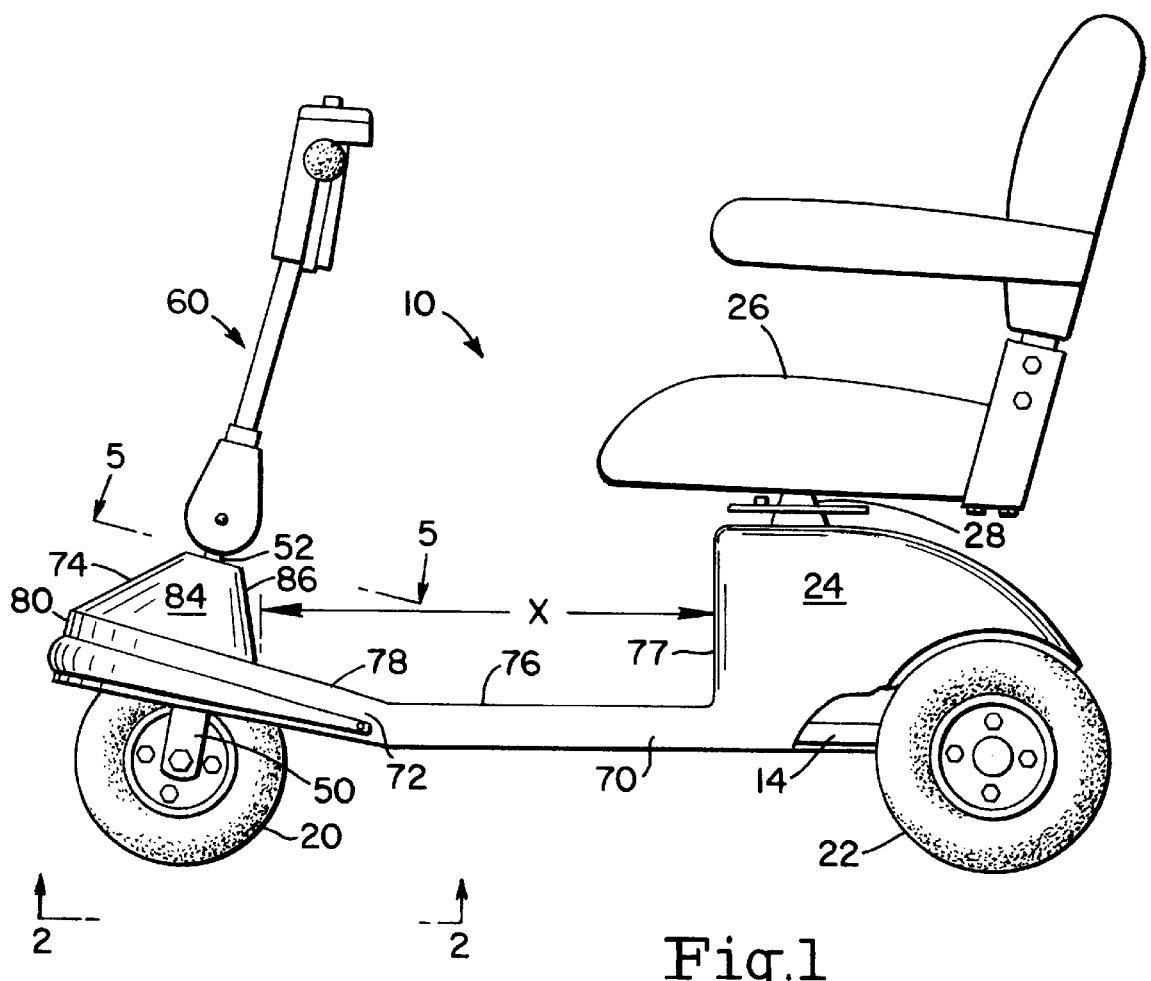
FIG. 1 is a side elevational view of the personal mobility vehicle of the invention.

Referring now to the drawings, the personal mobility vehicle or scooter 10 of the invention includes a main horizontally extending base frame 12 having laterally spaced longitudinally extending tubular side members 14 and 16 integrally joined to and closed by a continuous contoured tubular front member 18 which is supported in a novel fashion from the front wheel 20. The rear of frame members 14 and 16 are suitably supported from a pair of laterally spaced rear wheels 22 which are driven by a conventional battery operated transaxle motor assembly (not shown). A removable plastic housing 24 encases the battery and drive motor assembly. A seat 26 is removably mounted within a vertical tubular post support 28 which is attached to frame 12.

For reinforcement purposes frame 12 also includes a plurality of transverse tubular members 30 welded between side members 14 and 16 and a central tubular member 32 extending longitudinally underneath frame 12 and welded to the bottom of members 30.

Figure 2:
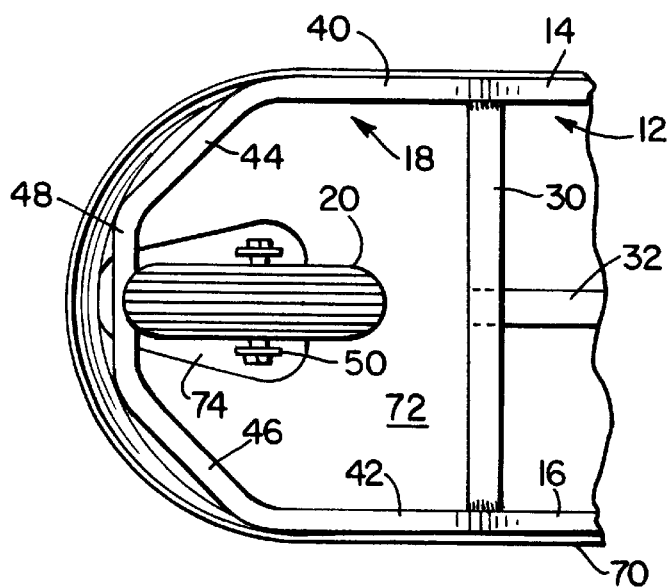
FIG. 2 is a fragmentary bottom plan view taken along line 2—2 of FIG. 1 illustrating the novel mounting assembly for the front wheel.

As illustrated in FIGS. 2, 3 and 4 the front contoured member 18 includes side sections 40 and 42 which incline forwardly and upwardly from side members 14 and 16, respectively, joining inwardly projecting sections 44 and 46 which join a central transverse front nose section 48.

Wheel 20 is mounted on a wheel yolk 50 which has a vertical shaft or spindle 52 that extends vertically upwardly through and is rotatable within a bearing head tube 54. Head tube 54 is supported along the longitudinal centerline of frame 12 by way of a bracket member or gusset 56 welded at its rear end to head tube 54 and at its forward end to nose section 48. Bracket 56 is a rectangular bar which extends forwardly and downwardly from head tube 54 to nose section 48 generally along the centerline of members 14 and 16 so that wheel 20 is centered along frame 12 between rear wheels 22. A conventional fold down steering tiller assembly 60 is connected to the upper end of spindle 52 so that the occupant of the vehicle may steer wheel 20 to the right or left as desired. A pair of stop lugs 62 and 64 are mounted on yolk 50 on each side of head tube 54 to limit the turning radius of wheel 20 to either the right or left direction of travel. Lugs 62 and 64 engage against gusset 56 to limit the turn radius and to prevent wheel 20 from spinning out of control.

A molded plastic floor pan 70 is mounted on the forward portion of frame 12 and includes a forward upwardly inclined section 72 having at its front end an integrally molded housing 74 which encloses head tube 54, gusset 56 and spindle 52. Floor pan 70 includes a horizontal foot support surface 76 extending forwardly from the vertical wall 77 of motor housing 24 and seat 26 to an upwardly inclined foot support surface 78 which extends around the sides of housing 74 to the front end 80 of pan 70.

As can best be seen in FIGS. 1, 4 and 5, housing 74 is very small and streamlined because of the simple manner in which wheel 20 and head tube 54 are supported from nose section 48 by a single forward gusset 56. There are no support elements which extend rearwardly from head tube 54. Consequently housing 74 is very compact and streamlined and its side walls 82 and 84 and its rear wall 86 are formed on a steep incline so as to maximize foot space on surface 78 along the sides 82 and 84 and to increase the distance X between the vertical wall 77 of motor housing 24 and the base of rear wall 86 of housing 74.

A vehicle 10 constructed according to the invention is of standard overall length of about 46 inches and a width of about 24 inches and the centerline distance between the axles of front wheel 20 and rear wheels 22 is about 36 inches. In a prior art conventional scooter in which the head tube 54 and wheel 20 were supported by a rearwardly extending bracket assembly from transverse member 30, the foot clearance X was only about 15½ inches. In a vehicle employing the wheel support mechanism illustrated in FIGS. 3, 4 of the invention, the foot clearance X was increased to about 19 inches, thus representing an increase of about 23% which is very significant for impaired persons who use these vehicles. Not only is the single forwardly extending gusset support 56 very simple in construction but it is also very strong. The bracket assembly supports the wheel 20 in such a way that there is clearance beneath the inclined foot support surface 78 and the top of wheel 20. Also there are no support elements or components which extend rearwardly or laterally from head tube 54 toward frame 12 which would interfere with and reduce the amount of foot clearance on surface 78 behind rear wall 86 and along the sides 82 and 84 of housing 74.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A personal mobility vehicle comprising a pair of rear wheels and a front wheel, a base frame supported from said rear wheels and said front wheel, power means for driving said rear wheels, said base frame including a pair of laterally spaced longitudinal extending members joined at their front ends by a front member, means mounting said front wheel behind said front member including a yoke connected to said front wheel and having a vertical shaft, a head tube rotatably receiving said vertical shaft, bracket means extending forwardly from and securing said head tube to said front member, said forwardly extending bracket means being the only support for said head tube and the area rearwardly of said head tube being clear and unobstructed to maximize foot clearance on said frame, and steering means connected to said shaft for turning said front wheel to the left or right.

2. The personal mobility vehicle as claimed in claim 1, comprising a floor pan mounted on said frame and a housing extending upwardly from said floor pan and covering said head tube and said bracket means, said housing being streamlined and compact to maximize available foot room on said floor pan.

3. The personal mobility vehicle as claimed in claim 2, said housing including rear and side walls which are steeply inclined with respect to said floor pan.

4. The personal mobility vehicle as claimed in claim 1, said bracket means comprising a gusset extending from said head tube to said front member generally along the longitudinal center line of said frame.

5. The personal mobility vehicle as claimed in claim 4, comprising a floor pan mounted on said frame and a housing extending upwardly from said floor pan and covering said head tube and said gusset means, said housing being streamlined and compact to maximize available, foot room on said floor pan.

6. The personal mobility vehicle as claimed in claim 5, said housing including rear and side walls which are steeply inclined with respect to said floor pan.

* * * * *